US006405419B1

(12) United States Patent
Juranitch et al.

(10) Patent No.: US 6,405,419 B1
(45) Date of Patent: Jun. 18, 2002

(54) ENGINE VALVE AND SEAT BURNISHING SYSTEM

(75) Inventors: James C. Juranitch, Walled Lake; Robert D. Olschefski, Farmington, both of MI (US)

(73) Assignee: Veri-Tek Inc., Wixom, MI (US)

( * ) Notice: Subject to any disclaimer, the term of this patent is extended or adjusted under 35 U.S.C. 154(b) by 0 days.

(21) Appl. No.: 09/264,177

(22) Filed: Mar. 8, 1999

(51) Int. Cl.$^7$ .................. B21C 37/30; B24B 39/00; F02N 3/00; G01M 3/08; B23Q 15/00; B23P 21/00
(52) U.S. Cl. .................. 29/90.01; 123/188.8; 73/47; 29/705; 29/888.42; 29/888.44
(58) Field of Search ................ 29/714, 90.01, 29/888.42, 888.44, 705; 123/188.8; 73/47, 49.7, 116, 119 R, 120; 74/55, 569

(56) References Cited

U.S. PATENT DOCUMENTS

| | | | | |
|---|---|---|---|---|
| 3,056,394 A | * | 10/1962 | Svendesen | |
| 3,585,974 A | * | 6/1971 | Weber | 123/90.12 |
| 3,874,225 A | * | 4/1975 | Fegel | 73/40 |
| 4,602,604 A | * | 7/1986 | Kauer | 123/508 |
| 5,540,498 A | * | 7/1996 | Chu | 366/160.4 |

\* cited by examiner

Primary Examiner—S. Thomas Hughes
Assistant Examiner—John C. Hong
(74) Attorney, Agent, or Firm—Rohm & Monsanto, PLC

(57) ABSTRACT

An arrangement for exercising (or burnishing) the intake and exhaust valves in the cylinder head of an internal combustion engine employs a plurality of out-of-phase eccentric cams coupled to a source of rotatory motion. The eccentric cams engage with respective linear drive arrangements that are urged into out-of-phase reciprocation with respect to each other. The linear drives urge the valves into repeated open and closed states where, in combination with valve rotators, burnishing of the sealing portion of the valves with the valves seats to improve the seal therebetween is effected. The use of eccentric cams to effect linear reciprocating motion achieves control over both directions of movement of the linear drive arrangements. The cylinder head is maintained in fixed relation to the linear drive arrangements by a hydraulic, pneumatic, or other form of ram, the ram also creating a test chamber. Thus, after the exercising of the valves is completed, the test chamber is pressurized with a fluid such as air, and the subsequent loss of pressure within the test chamber is indicative of the quality of the seal between the valve and the valve seats. Preferably, reciprocation of the linear drive arrangements is achieved by coupling a cam follower to a substantially annular eccentric protuberance having radially inward and outward surfaces. The application of excessive force is precluded by the use of springs within the linear drives.

22 Claims, 6 Drawing Sheets

ENGINE VALVE AND SEAT BURNISHING SYSTEM

BACKGROUND OF THE INVENTION

1. Field of the Invention

This invention relates generally to internal combustion engine preconditioning and testing systems, and more particularly, to an arrangement that exercises and burnishes intake and exhaust valves in their respectively associated seats in a cylinder head to improve the quality of the seal therebetween and that identifies valves that do not provide an adequate seal.

2. Description of the Related Art

There is a need in the engine assembly industry for a system that permits leak testing in an engine head assembly with sufficient resolution to determine whether a problem exists, or is expected to exist, in the mating valve surfaces. The performance of a leak test in a production environment applied to engine intake and exhaust valves is difficult. A primary reason why valves and seats do not form adequate seals is that contaminants and small surface imperfections exist between the mating surfaces. Usually, minor imperfections are quickly burnished out during normal engine operation and result in no long term quality issues. However, the early assembly imperfection and contaminations permit excessive leakage through the valve assembly. Engine manufacturers cannot in practice fail all of the assemblies that have this leakage condition during the manufacturing process as such would require failure of many leaking valve assemblies that would correct themselves during normal engine operation.

The prior art has sought to achieve a solution to this problem by constructing equipment that uses a conventional engine cam and/or hydraulics to exercise a valve assembly prior to a leak test. This action burnishes-in the valves to an extent that permits a more accurate leak test to be performed. It is a problem with known equipment, however, that the extent of burnishing is directly proportional to the load experienced by the mating valve surfaces and the amount of "hits" (or cycles) that the valve assembly is permitted to experience during the burnishing operation. In a known hydraulic system, the "hits" in the mating valve seats are not of optimum amplitude as a result of the amount of mass and fluid that has to be returned by an engine valve spring before it contacts the seat. It is also a disadvantageous characteristic of known arrangements that the amplitude of the "hits" is minimized since an engine cam that is used to drive the valves is optimized to minimize the valve loading.

There is a need, therefore, for an arrangement that quickly exercises the engine valves to achieve an amount of burnishing adequate to permit a valid and accurate leak test to be performed thereafter. The amplitude of the "hits," however, should not be so large as to damage the valves or the seats in the cylinder head.

It is, therefore, an object of this invention to provide an arrangement that exercises and burnishes engine intake and exhaust valves so that adequate leak testing can be conducted immediately thereafter.

It is another object of this invention to provide an arrangement that improves the quality of the seals effected between engine valves and their respective seats.

It is also an object of this invention to provide an engine valve exercising arrangement that can operate over a broad range of operating speeds.

It is a further object of this invention to provide an arrangement that quickly exercises the intake and exhaust valves of an internal combustion engine with the application of valve loading that is greater than that which is achieved by a conventional valve train.

SUMMARY OF THE INVENTION

The foregoing and other objects are achieved by this invention which provides, in a first apparatus aspect thereof, an arrangement for seating a valve in valve seat in a first side of a cylinder head of an internal combustion engine. The valve is of the type having a valve sealing portion for communicating with the valve seat and a valve stem that is accessible on a second side of a cylinder head. In accordance with the invention, a source of reciprocating motion effects reciprocation along a predetermined linear path of reciprocation. A first jig defines a predetermined location of the cylinder head in relation to the source of reciprocating motion. A coupling arrangement couples the source of reciprocating motion to the valve in the cylinder head. Additionally, a second jig is provided for communicating with the first side of the cylinder head and defining a test chamber that surrounds the valve seat and the valve sealing portion.

In one embodiment of this aspect of the invention there is provided a ram for applying a force to the second jig and urging same into sealed relation with the first side of the cylinder head. In some embodiments, the ram also urges the cylinder head against the first jig whereby it is maintained in fixed relation with respect to the source of reciprocating motion.

A valve rotating arrangement, which may be incorporated in the cylinder head, causes the valve to rotate with respect to the valve seat as the valve is displaced reciprocatingly along its respective displacement path. Such rotation enhances the valve seating in the valve seat of the cylinder head.

The test chamber is provided with a fluid input to permit delivery thereto of a fluid whereby a pressure retention test is performed in the test chamber. In one embodiment, the fluid input is in the form of a air inlet. There is additionally provided a pressure sensor that produces a signal responsive to the pressure in the test chamber.

One or more sealing elements are provided for sealing apertures in the cylinder, as would be the case with a fuel injector of a Diesel engine.

In an embodiment of the invention, the source of reciprocating motion includes a source of rotatory motion for rotating about an axis of rotation. An eccentric cam is coupled to the source of rotatory motion and arranged to rotate therewith. A linear drive arrangement has a first end thereof arranged to communicate with the valve stem of the valve, the linear drive arrangement and the valve being displaceable along parallel respective displacement paths. Additionally, a cam follower is coupled to the eccentric cam and to the linear drive arrangement. In this manner, the linear drive arrangement is urged into reciprocating linear motion in response to the rotation of the eccentric cam.

In a highly advantageous embodiment of the invention, the eccentric cam is formed of a closed, substantially annular protuberance extending substantially axially parallel to the axis of rotation. The substantially annular protuberance has radially inward and radially outward facing surfaces. In this embodiment, the cam follower is formed of first and second cam follower rollers that are arranged substantially parallel to one another and to communicate with respective ones of the radially inward and radially outward facing surfaces of the substantially annular protuberance.

In a further embodiment of the invention, the linear drive arrangement is formed of a reciprocating element that is coupled to the first and second cam follower rulers. The reciprocating element has a first predetermined cross-sectional configuration. A stationary guide way is provided with a predetermined cross-sectional configuration that corresponds to that of the first predetermined cross-sectional configuration of the reciprocating element, and thereby accommodates same therewithin. In a highly advantageous embodiment, a Teflon® sheet insert is interposed between the reciprocating element and the stationary guide way for reducing friction therebetween. It has been discovered that this arrangement provides a highly advantageous low-friction reciprocating system that does not require any additional lubricants. In fact, most known lubricants increase the friction between the Teflon® sheet insert and the reciprocating element. The application of excessive force to the valve stem by the reciprocating element is precluded by a resilient overload element that provides a resilient accommodation of a force that would exceed a predetermined magnitude. The resilient overload element may be in the form of a spring having a resilience characteristic that would protect the valve from excessive or damaging forces.

In a highly advantageous embodiment of the invention, two engine valves are exercised and tested simultaneously. Thus, there is provided a second valve in the first side of the cylinder head of the internal combustion engine, the cylinder head having a second valve seat in the first side thereof. The valve is of the type having a respective valve sealing portion for communicating with the second valve seat, and a valve stem that is accessible on the second side of the cylinder head, as is the first valve. A second eccentric cam is coupled to the source of rotatory motion arranged to rotate therewith. A second linear drive arrangement has a first end thereof arranged to communicate with the valve stem of the second valve, the linear drive arrangement and the valve being displaceable along parallel respective displacement paths. A second cam follower is coupled to the second eccentric cam and to the second linear drive arrangement. In this manner, the second linear drive arrangement is urged into reciprocating linear motion in response to the rotation of the second eccentric cam.

In one embodiment of this dual valve-testing arrangement, the first and second eccentric cams are coaxially coupled to the source of rotatory motion and arranged to rotate therewith. Each of the first and second eccentric cams is formed as a closed, substantially annular protuberance that extends substantially axially parallel to the axis of rotation. Each of the annular protuberances has respective radially inward and radially outward facing surfaces, and are arranged to extend in opposite directions. In a further embodiment, both eccentric cams are coupled to the source of rotatory motion in an out-of-phase relationship with respect to one another.

In accordance with a further apparatus aspect of the invention, there is provided an arrangement for seating a valve in a valve seat in a first side of a cylinder head of an internal combustion engine. As previously indicated, the valve is of the type having a valve sealing portion for communicating with the valve seat, and is further provided with a valve stem that is accessible on a second side of the cylinder head. In accordance with this further aspect of the invention, there is provided a source of rotatory motion for rotating about an axis of rotation. An eccentric cam is coupled to the source of rotatory motion and is arranged to rotate therewith. A first end of a linear drive arrangement is arranged to communicate with the valve stem of the valve, the linear drive arrangement and the valve being displaceable along parallel respective displacement paths. A cam follower is coupled to the eccentric cam and to the linear drive arrangement, such that the linear drive arrangement is urged into reciprocating linear motion long a predetermined linear path of reciprocation in response to the rotation of the eccentric cam. A first jig defines a predetermined location of the cylinder head in relation to the source of reciprocating motion. A second jig communicates with the first side of the cylinder head and defines a test chamber that surrounds the valve seat and the valve sealing portion. A force is applied to the second jig by a ram that urges same into sealed relation with the first side of the cylinder head. Fluid is then introduced via a fluid input to the test chamber, whereby a pressure retention test is performed in the test chamber.

It is noteworthy that the reciprocating motion of the linear drive arrangement is controlled in both directions. That is, the valve springs are not relied upon to urge the linear drive arrangement during the closing stroke of the valve. In this inventive arrangement, therefore, significantly higher valve loading can be achieved over conventional cam and hydraulic lifter arrangements, where the valve return spring must additionally urge a significantly increased mass, as well as oil in the lifters, during the return (to closed state) stroke. This additional loading imposed by the valve train components in conventional arrangements reduces the return rate of the valve, and consequently the time period required to exercise the valve to achieve an adequate break-in, or burnishing, of the valve and the valve seat, whereby a meaningful leak test can be performed, is significantly extended.

In one embodiment of the invention, the eccentric cam is as previously described having a substantially annular protuberance extending substantially axially parallel to the axis of rotation. The substantially annular protuberance has radially inward and radially outward facing surfaces. Further in this embodiment, first and second cam follower rollers are arranged substantially parallel to one another and to communicate with respective ones of the radially inward and radially outward facing surfaces of the substantially annular protuberance. The linear drive arrangement is provided, in one embodiment, with a reciprocating element that is coupled to the first and second cam follower rollers, the reciprocating element having a first predetermined cross-sectional configuration. A stationary guide way has a predetermined cross-sectional configuration that is configured to correspond to the first predetermined cross-sectional configuration, whereby the reciprocating element is accommodated within the stationary guide way. Lubrication is effected as previously described by the interposition of a Teflon® sheet between the reciprocating element and the stationary guide way.

The communication between the linear drive arrangement and the valve stem is such as to permit the valve to rotate by operation of a valve rotating arrangement. Thus, as the valve is reciprocated, it is also rotated, thereby enhancing the seal between the sealing portion of the valve and the seat in the cylinder head.

In accordance with a method aspect of the invention, there is provided a method of seating a valve in a valve seat in a first side of a cylinder head of an internal combustion engine. The valve is of the type having a valve sealing portion for communicating with the valve seat. Additionally, the valve has a valve stem that is accessible on a second side of the cylinder head. In accordance with the invention, the method includes the steps of:

controlling a substantially linear reciprocating motion of a reciprocating drive arrangement;

coupling the valve to the reciprocating drive arrangement;

rotating the valve with respect to the valve seat; and testing the seal between the valve sealing portion and the valve seat in the first side of the cylinder head.

In one embodiment of this method aspect of the invention, prior to performing the step of controlling there is provided the further step of positioning the cylinder head in fixed relation to the reciprocating drive arrangement. In an advantageous embodiment, the step of positioning the cylinder head comprises the further the further step of forming a test chamber on the first side of a cylinder head. In addition, the step of positioning the cylinder head includes the further step, in one embodiment, of operating a ram to apply a force to the cylinder head and against a positioning jig.

Testing is effected by the step of pressurizing the test chamber with a fluid to determine whether leakage is present between the valve sealing portion and the valve seat in the first side of the cylinder head. The pressure in the test chamber is monitored over a predetermined period of time.

This method aspect of the invention further includes, in one embodiment, the step of sealing an injector opening in the cylinder head during the step of pressurizing.

In a further embodiment of the invention, the step of controlling includes the further steps of:

operating a source of rotatory motion;

rotating an eccentric cam in synchrony with the source of rotatory motion; and constraining a cam follower arrangement to move reciprocatingly in response to the step of rotating an eccentric cam. In a further embodiment, the step of constraining includes the step of interposing a Teflon® lubricating sheet between stationary and reciprocating portions of the reciprocating drive arrangement.

BRIEF DESCRIPTION OF THE DRAWING

Comprehension of the invention is facilitated by reading the following detailed description, in conjunction with the annexed drawing, in which.

DETAILED DESCRIPTION

Figure 1:
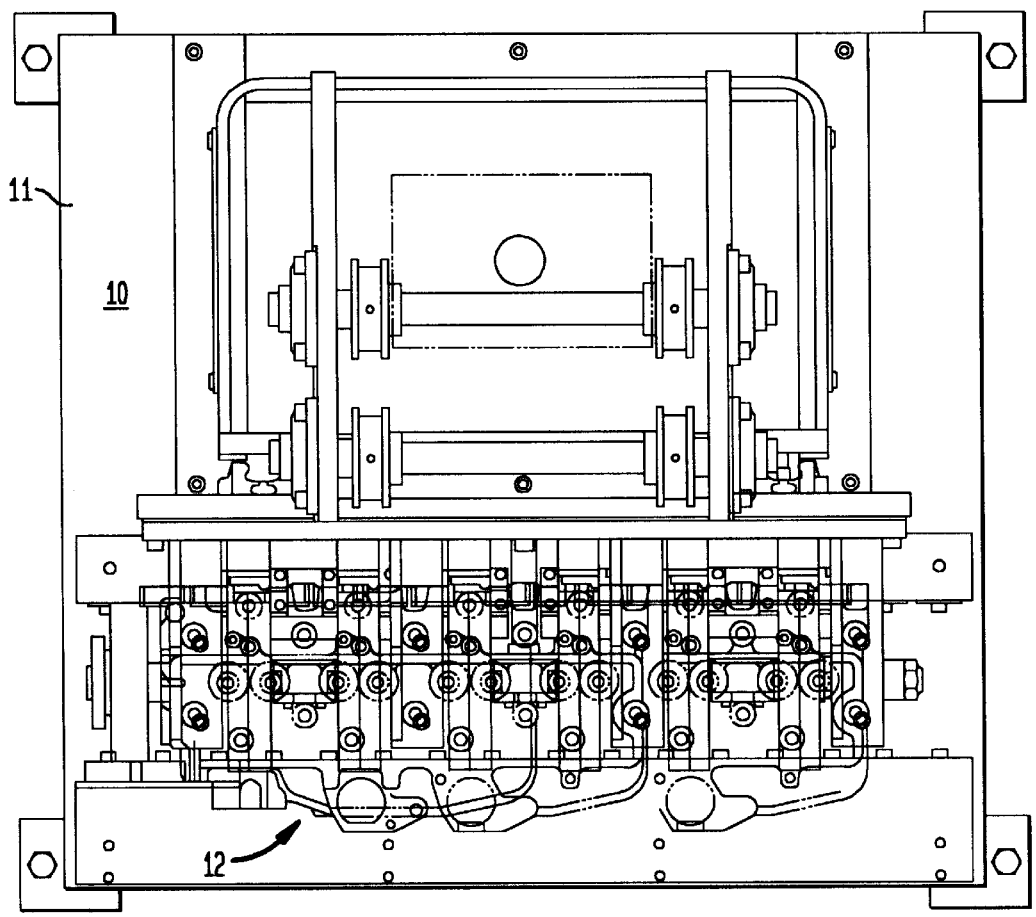
FIG. 1 is a top plan representation of an engine valve exerciser arrangement constructed in accordance with principles of the invention.

FIG. 1 is a top representation of a valve exerciser 10 having a housing 11 in which is supported a cylinder head 12 of an internal combustion engine (not shown).

Figure 2:
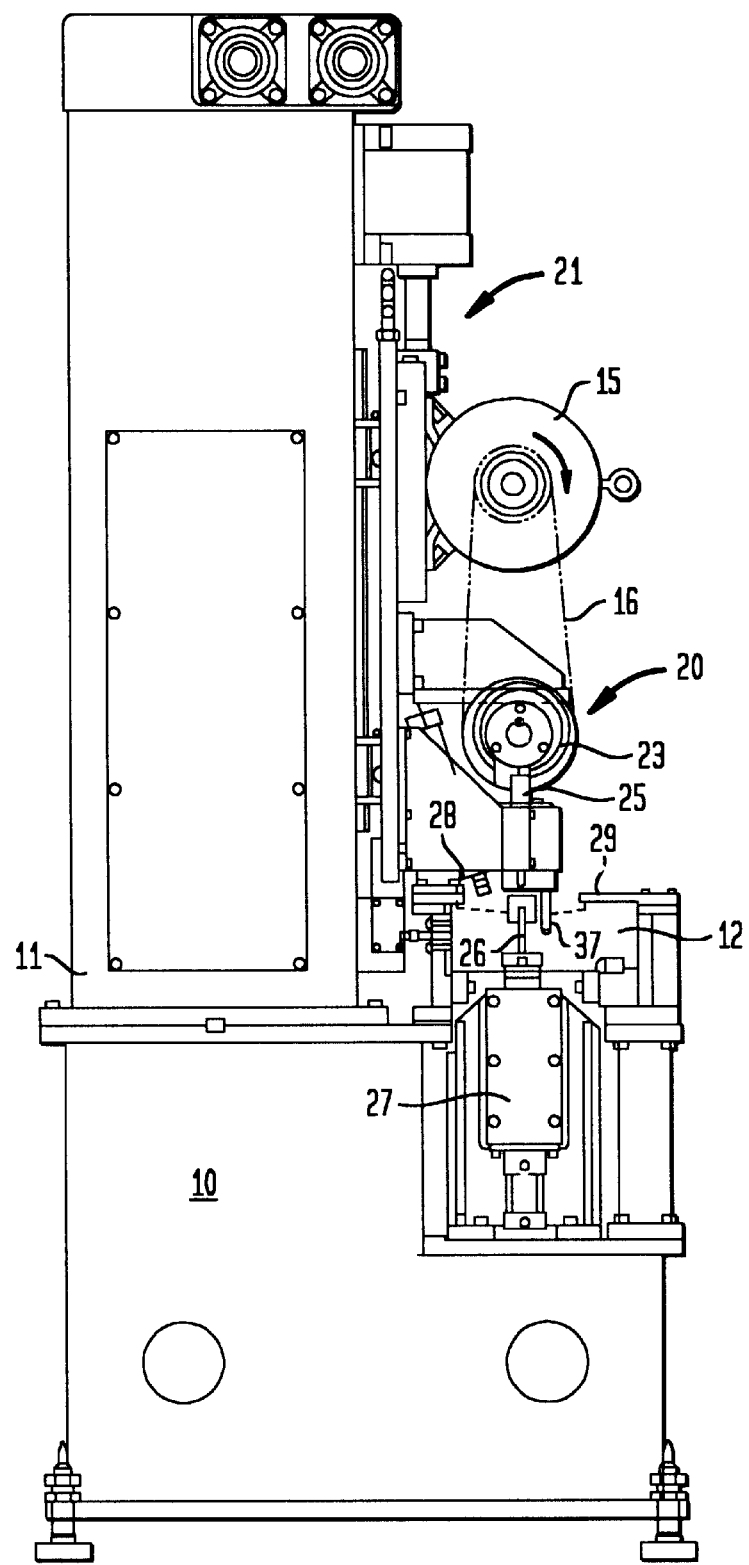
FIG. 2 is a side representation of the engine valve exercise arrangement of FIG. 1.

FIG. 2 is a simplified side representation of valve exerciser 10, further showing a source of rotatory motion, in the form of a motor 15 that is coupled via a drive belt 16 to an eccentric cam arrangement 20. In this embodiment of the invention, motor 15 and eccentric cam arrangement 20 are vertically displaceable by operation of a vertical drive 21.

In this embodiment, and as will be described in detail hereinbelow, eccentric cam arrangement 20 is provided with an eccentric portion 23 that is arranged to rotate in response to the rotation of motor 15 and the coupling thereto by drive belt 16. A reciprocating element 25 is coupled to eccentric portion 23 and communicates reciprocatingly with a valve 26 in cylinder head 12. Cylinder head 12 is shown schematically an in phantom in this figure for sake of clarity. The cylinder head is urged upwardly by a ram arrangement 27 that urges the cylinder head against fixture jigs 28 and 29, whereby the cylinder head is maintained in fixed relation to reciprocating element 25 that communicates with valve 26. Registration of reciprocating element 25 with valve 26 is ensured by a guide pin 37 that is accommodated within an opening (not specifically identified in cylinder head 12).

Figure 3:
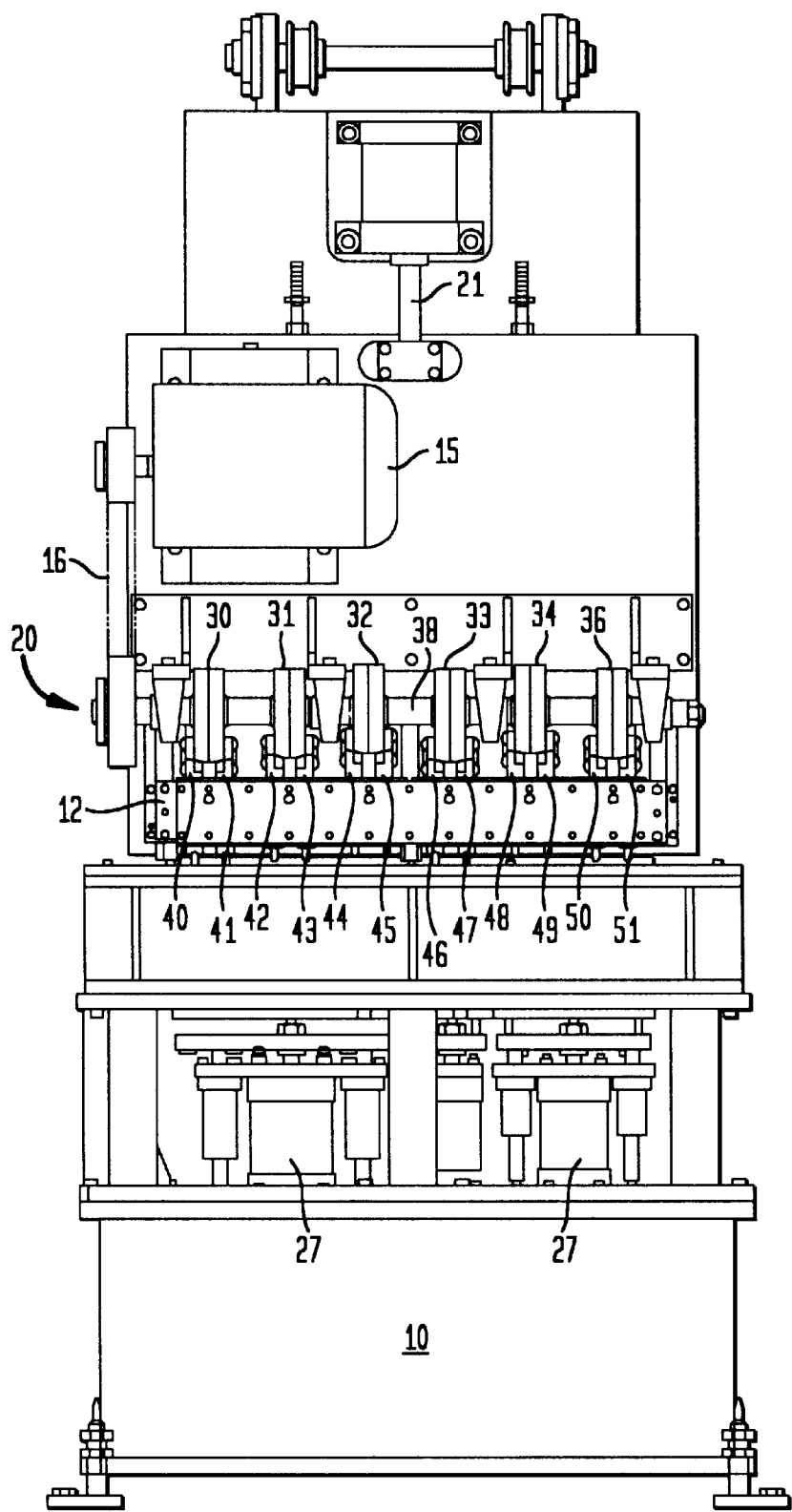
FIG. 3 is a front representation of the valve exerciser arrangement of FIG. 1.

FIG. 3 is a front representation of valve exerciser 10. Elements of structure that have previously been described are similarly designated. As shown in this figure, eccentric cam arrangement 20, which is driven rotatively by operation of motor 15 via drive belt 16 is formed of a plurality of eccentric pairs 30–36 that are shown to be coupled to a common shaft 38. Each of the eccentric pairs is coupled to a respectively associated pair of cam followers 40–51.

Figure 4:
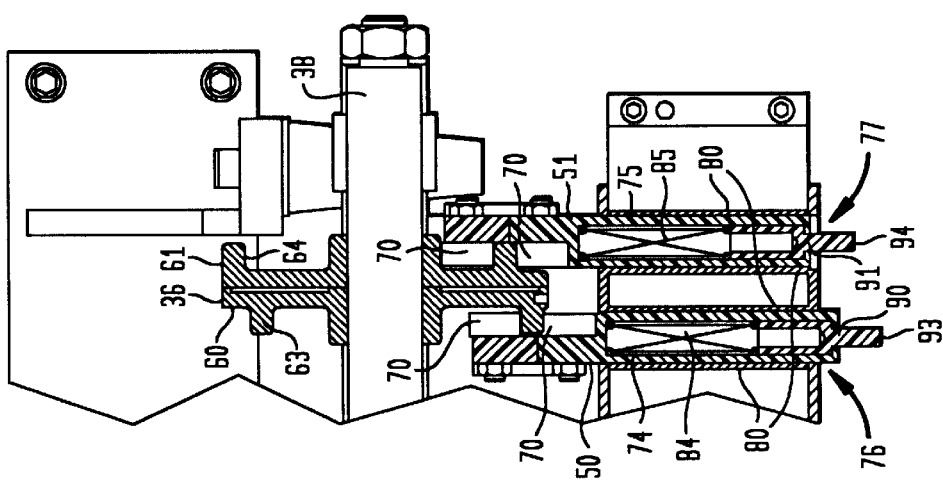
FIG. 4 is a partially cross-sectional representation of first and second substantially annular cam elements and associated reciprocating elements in an out-of-phase relation.

FIG. 4 is a partially cross-sectional expanded representation of eccentric pair 36, which is illustrative of all of the eccentric pairs of this embodiment. Elements of structure that have previously been described are similarly designated. As shown, eccentric pair 36 is formed of eccentric cams 60 and 61 each formed of respective ones of substantially annular protuberances 63 and 64, which extend substantially axially parallel to the axis of rotation of shaft 38, but in opposite directions in this embodiment. Each of the substantially annular protuberances has a radially inward and radially outward faces (not specifically designated) that engage with respective rollers 70 of cam followers 50 and 51. As rollers 70 roll on the respective radially inward and radially outward surfaces of substantially annular protuberances 63 and 64, the cam followers are urged into reciprocating motion. As can be seen in the figure, eccentric cams 60 and 61 are installed out-of-phase with respect to one another. Thus, cam follower 50 is shown to be in a lower vertical position than cam follower 51.

In this embodiment of the invention, cam followers 50 and 51 are coupled to respective reciprocating elements 74 and 75 that have a substantially rectangular cross-sectional configuration (not shown). Each such reciprocating element is accommodated in a respective one of stationary guideways 76 and 77. Respective sheets of Teflon® material 80 are interposed between the reciprocating elements and the stationary guideways, to reduce friction therebetween.

In this specific illustrative embodiment of the invention, each of reciprocating elements 74 and 75 contain therewithin a respective one of compression springs 84 and 85 (shown schematically) that exerts a resilient force against a respectively associated one of plungers 90 and 91. Each of plungers 90 and 91 has a respective protruding one of tips 93 and 94 for pressing on the end of the valve stem (not shown in this figure). Thus, as each of the tips of the plungers is urged axially onto the valve stem whereupon the valve being exercised is opened, the application of an excessive force is precluded by the resilient compression characteristic of the associated one of springs 84 and 85.

Figure 5:
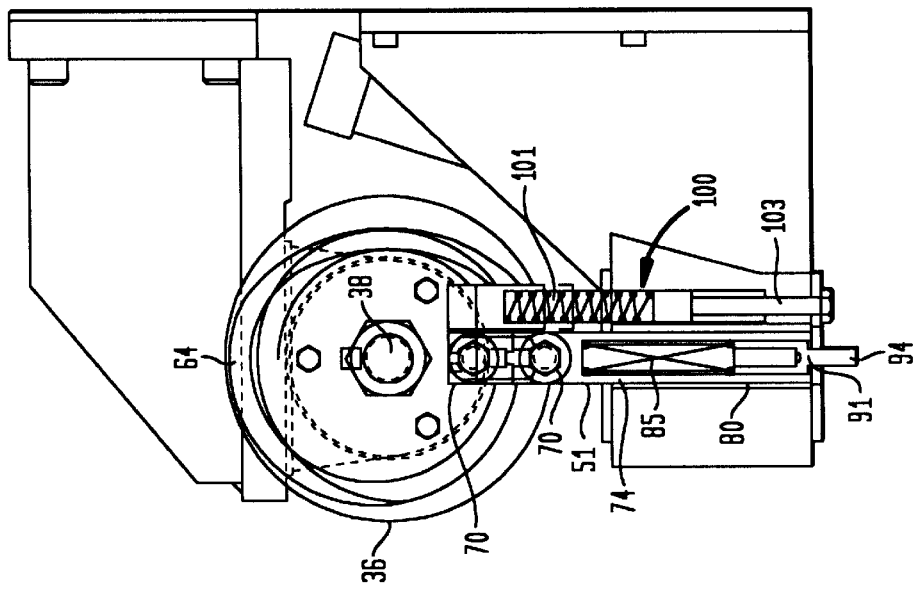
FIG. 5 is a side representation of the embodiment of FIG. 4.

FIG. 5 is a partially phantom side representation of the embodiment of FIG. 4. Elements of structure that have previously been discussed are similarly designated. This figure shows a resilient biasing arrangement 100 that, by operation of a spring 101, operates against a support rod 103, urges cam follower 51 upwardly, whereby communication is maintained between the radially outer face of substantially annular protuberance 64 and roller 70.

It is additionally evident from FIGS. 4 and 5 that the reciprocating motion of reciprocating elements 74 and 75, and particularly tips 93 and 94, is controlled in both directions. That is, the valve springs (see, for example, valve spring 156 in FIG. 7) are not relied upon to cause return of the reciprocating elements. In this inventive arrangement, therefore, significantly higher valve loading can be achieved over conventional cam and hydraulic lifter arrangements (not shown), where the valve return spring must additionally urge a significantly increased mass, as well as oil in the lifters, during the return (to closed state) stroke. This additional loading by the stated valve train components in conventional arrangements reduces the return rate of the valve, and consequently the time period required to exercise the valve to achieve an adequate break-in, or burnishing, of the valve and the valve seat, whereby a meaningful leak test can be performed, is significantly extended.

Figure 6:
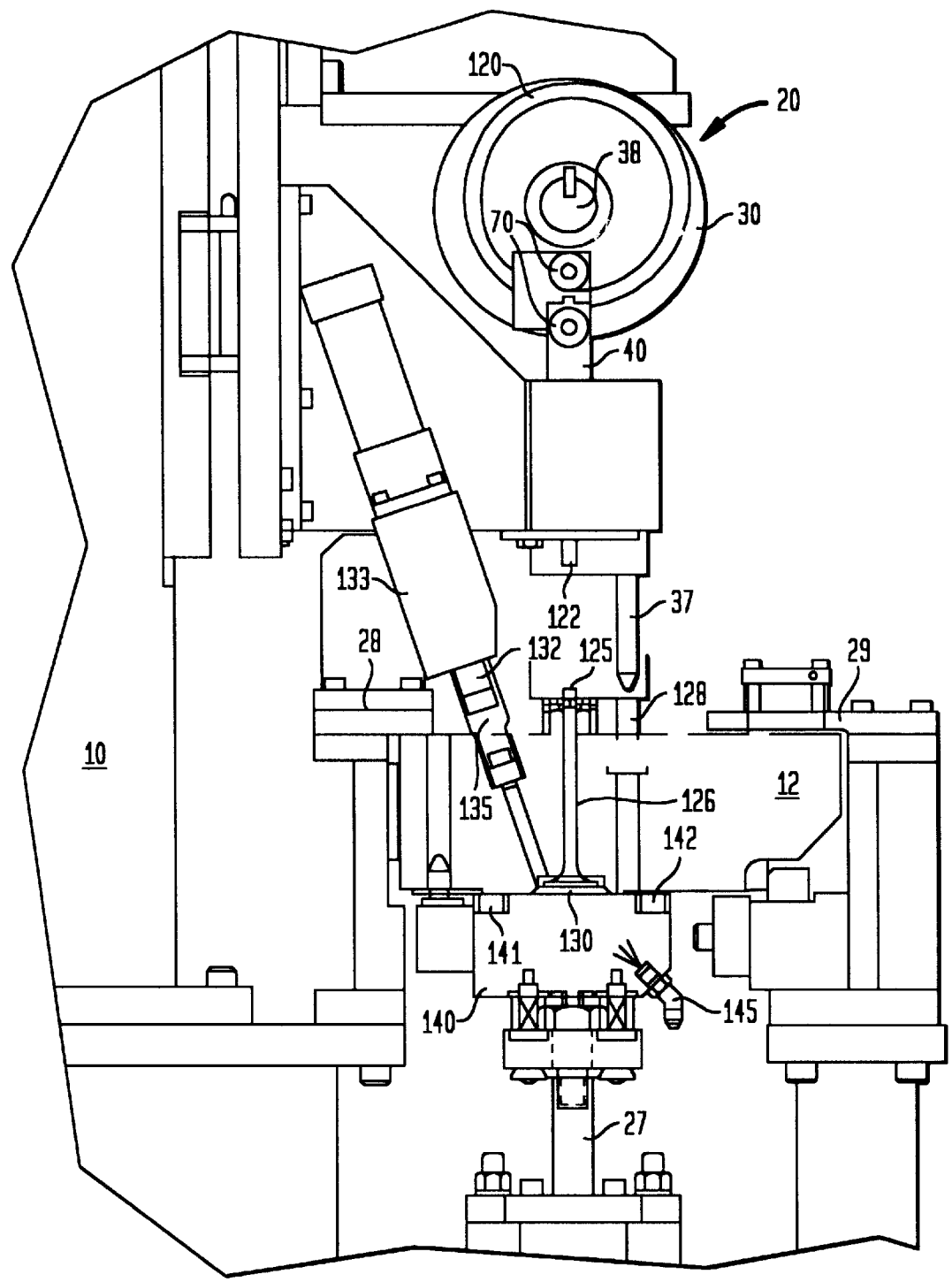
FIG. 6 is a simplified schematic representation of the embodiment of FIG. 1 showing a cylinder head in position for performance of a valve leak test.

FIG. 6 is a simplified schematic representation of a side representation of the embodiment of FIG. 1 that is fragmented and enlarged to show details of the engagement between valve exerciser 10 and cylinder head 12. Elements of structure that previously have been described are similarly designated. As shown, the substantially annular protuberance 120 is arranged to be rotatable with a shaft 38. A pair of rollers 70 are arranged to communicate with the radially inward and radially outward surfaces (not specifically designated) of substantially annular protuberance 120. Rollers 70 are coupled to reciprocating element 40 (as described hereinabove with respect to FIG. 3), whereupon a tip 122 of a plunger (not shown) contained within reciprocating element 40 will communicate with end 125 of valve stem 126. The communication between tip 122 and valve stem end 125 is effective when vertical drive 21 (not shown in this figure) lowers eccentric cam arrangement 20 such that guide pin 30 is engaged within receiving aperture 128 of cylinder head 12. In the condition shown in FIG. 6, however, eccentric cam arrangement 20 has been raised whereby, as shown, plunger tip 122 and valve stem end 125 are not in communication with one another, and therefore, valve 130 is closed. At this time, a plunger 132 is extended out of plunger arrangement 133 so as to seal fuel injection port 135.

As previously described, ram 127 is urged upward by pneumatic or hydraulic pressure whereby cylinder head 12 is pressed against fixture jigs 28 and 29. There is, however, interposed between ram 27 and cylinder head 12 a test chamber 140 that is urged into sealing communication, by operation of seals 141 and 142, against the surface of cylinder head 12. At this time, a fluid, such as air, is injected into test chamber 140 via a fluid inlet 145 so as to pressurize the test chamber. The pressure within test chamber 140 is monitored, the pressure fall therewithin being responsive in large measure to the quality of the seal between valve 130 and the valve seats (not specifically designated) in cylinder head 12. Thus, immediately after valve 130 is exercised, it can be subjected to pressure testing to determine the quality of the valve seal.

Figure 7:
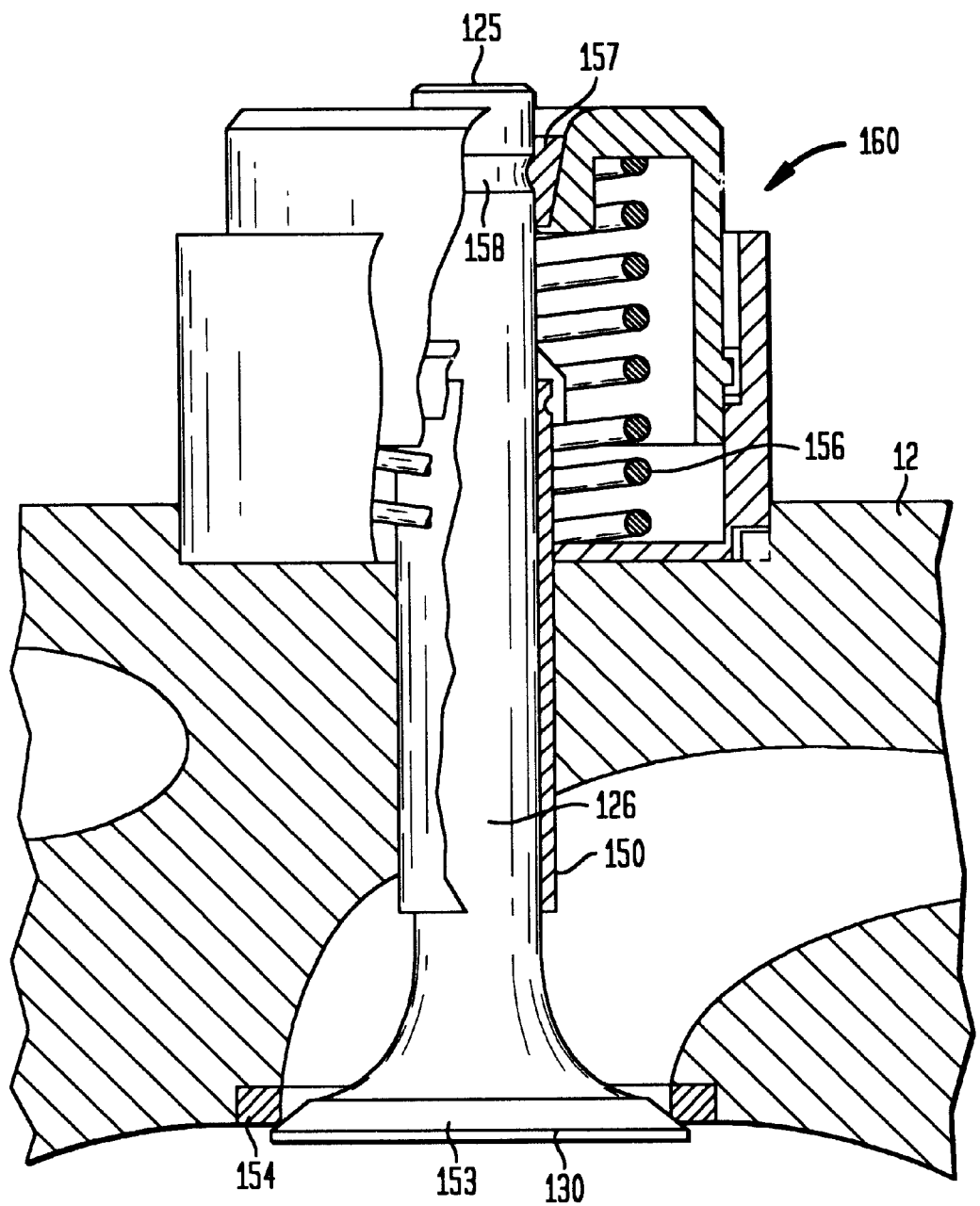
FIG. 7 is a partially fragmented representation of a valve showing a return spring and a known mechanism for causing incremental valve rotation in response to reciprocation.

FIG. 7 is a simplified, partly cross-sectional representation of valve 130, and further showing an arrangement for effecting incremental rotation of valve 130 as it is exercised, as previously described. Valve 130, and particularly valve stem 126, is shown to be disposed within a valve guide 150. In this figure, valve 130 is in a closed state, wherein a beveled sealing portion 153 is disposed in sealing communication with a valve seat 154. The force that is applied to effect the communication between sealing portion 153 and valve seat 154 is provided by a valve spring 156 that applies as resilient biasing force between cylinder head 12 and a valve lock 157 that engages an annular depression 158 in valve stem 126.

In the practice of the invention, any of several known valve rotation arrangements can be employed to effect incremental rotation of the valve during reciprocation by the valve exerciser, as described hereinabove. One such valve rotation arrangement is described in U.S. Pat. No. 5,570,663, and which is represented as valve rotator 160 in FIG. 7.

During the exercise operation, valve 130 is urged into the open condition by plunger tip 122 (FIG. 6) that is urged downwardly in response to rotation of eccentric cam arrangement 20 when the unit has been lowered by vertical drive 21. As the load applied by plunger tip 122 is released, the valve is urged upwardly into a closed condition by operation of valve spring 156. It is important not to operate the eccentric valve arrangement at a rate whereby plunger tip 122 is urged upwardly at a faster rate than valve 130 is returned by operation of valve spring 156. Such high speed operation is termed a "float" condition, and the continued slamming of beveled sealing portion 153 against valve seat 154 under the full force valve spring 156 can damage the valve and/or the valve seat. In a practical embodiment of the invention, a cylinder head of a diesel engine is exercised at up to approximately 1,100 rpm at shaft 38.

Although the invention has been described in terms of specific embodiments and applications, persons skilled in the art can, in light of this teaching, generate additional embodiments without exceeding the scope or departing from the spirit of the claimed invention. For example, and without limitation, other forms of reciprocating drives that do not depend upon the valve spring to effect a return of the drive may be used in the practice of the invention. Accordingly, it is to be understood that the drawing and description in this disclosure are proffered to facilitate comprehension of the invention, and should not be construed to limit the scope thereof.

What is claimed is:

1. An arrangement for exercising and seating a valve in a valve seat in a first side of a cylinder head of an internal combustion engine, the valve having a valve sealing portion for communicating with the valve seat and a valve stem that is accessible on a second side of the cylinder head, the arrangement comprising:

a source of reciprocating motion disposed on the second side of the cylinder head, the reciprocating motion being effected along a predetermined linear path of reciprocation;

a first jig disposed on the second side of the cylinder head for defining a predetermined location of the cylinder head in relation to said source of reciprocating motion;

a drive arrangement disposed on the first side of the cylinder head for urging the cylinder head into communication with said first jig;

a coupling arrangement for coupling the source of reciprocating motion to the valve in the cylinder head; and a second jig for communicating with the first side of the cylinder head and defining a test chamber surrounding the valve seat and the valve sealing portion.

2. The arrangement of claim 1, wherein there is further provided a ram for applying a force to said second jig for urging same into sealed relation with the first side of the cylinder head.

3. The arrangement of claim 2, wherein the force applied by said ram also urges the cylinder head against said first jig and into fixed relation with respect to said source of reciprocating motion.

4. The arrangement of claim 1, wherein there is further provided a valve rotating arrangement for rotating the valve with respect to the valve seat as the valve is displaced reciprocatingly along its respective displacement path.

5. The arrangement of claim 1, wherein there is further provided a fluid input coupled to the test chamber for delivering a fluid thereto and performing a pressure retention test in the test chamber.

6. The arrangement of claim 5, wherein said fluid input comprises an air inlet, and there is further provided a pressure sensor for producing a signal responsive to a pressure in the test chamber.

7. The arrangement of claim 1, wherein the internal combustion engine is a Diesel engine, and there is further provided a sealing element for sealing a fuel injector opening in the cylinder head of the Diesel engine.

8. The arrangement of claim 1, wherein said source of reciprocating motion comprises:
   a source of rotatory motion for rotating about an axis of rotation;
   a first eccentric cam coupled to said source of rotatory motion and arranged to rotate therewith;
   a linear drive arrangement having a first end thereof arranged to communicate with the valve stem of the valve, said linear drive arrangement and the valve being displaceable along parallel respective displacement paths; and
   a cam follower coupled to said first eccentric cam and to said linear drive arrangement, whereby said linear drive arrangement is urged into reciprocating linear motion in response to the rotation of said first eccentric cam.

9. The arrangement of claim 8, wherein said first eccentric cam comprises a closed, substantially annular protuberance extending substantially axially parallel to the axis of rotation, said substantially annular protuberance having radially inward and radially outward facing surfaces.

10. The arrangement of claim 9, wherein said cam follower comprises first and second cam follower rollers arranged substantially parallel to one another and arranged to communicate with respective ones of said radially inward and radially outward facing surfaces of said substantially annular protuberance.

11. The arrangement of claim 10, wherein said linear drive arrangement comprises:
    a reciprocating element coupled to said first and second cam follower rollers, and having a first predetermined cross-sectional configuration; and
    a stationary guide way having a predetermined cross-sectional configuration that is configured to correspond to the first predetermined cross-sectional configuration.

12. The arrangement of claim 11, wherein there is further provided a sheet insert formed of polyfluorinated hydrocarbon material sold under the trademark Teflon® interposed between said reciprocating element and said stationary guideway for reducing friction therebetween.

13. The arrangement of claim 11, wherein there is further provided a resilient overload element for providing a resilient accommodation of a linear force exceeding a predetermined magnitude.

14. The arrangement of claim 8, wherein there is provided a second valve in the first side of the cylinder head of the internal combustion engine, the cylinder head having a second valve seat for in the first side of a cylinder head, the valve being of the type having a respective valve sealing portion for communicating with the second valve seat and a valve stem that is accessible on the second side of the cylinder head, there being further provided:
    a second eccentric cam coupled to said source of rotatory motion and arranged to rotate therewith;
    a second linear drive arrangement having a first end thereof arranged to communicate with the valve stem of the second valve, said linear drive arrangement and the valve being displaceable along parallel respective displacement paths; and
    a cam follower coupled to said second eccentric cam and to said linear drive arrangement, whereby said second linear drive arrangement is urged into reciprocating linear motion in response to the rotation of said second eccentric cam.

15. The arrangement of claim 14, wherein said first and second eccentric cams are coaxially coupled to said source of rotatory motion and arranged to rotate therewith, each of said first and second eccentric cams comprising a closed, substantially annular protuberance extending substantially axially parallel to the axis of rotation, said substantially annular protuberances each having radially inward and radially outward facing surfaces and arranged to extend in opposite directions.

16. The arrangement of claim 15, wherein said first and second eccentric cams are coupled to said source of rotatory motion out of angular phase with respect to one another.

17. An arrangement for exercising and seating a valve in a valve seat in a first side of a cylinder head of an internal combustion engine, the valve having a valve sealing portion for communicating with the valve seat and a valve stem that is accessible on a second side of the cylinder head, the arrangement comprising:
    a source of rotatory motion disposed on the second side of the cylinder head for rotating about an axis of rotation;
    an eccentric cam disposed on the second side of the cylinder head and coupled to said source of rotatory motion and arranged to rotate therewith;
    a linear drive arrangement having a first end thereof arranged to communicate with the valve stem of the valve, said linear drive arrangement and the valve being displaceable along parallel respective displacement paths;
    a cam follower coupled to said eccentric cam and to said linear drive arrangement, whereby said linear drive arrangement is urged into reciprocating linear motion along a predetermined linear path of reciprocation in response to the rotation of said eccentric cam;
    a first jig disposed on the second side of the cylinder head for defying a predetermined location of the cylinder head in relation to said source of reciprocating motion;
    a second jig for communicating with the first side of the cylinder head and defining a test chamber surrounding the valve seat and the valve sealing portion;
    a ran for applying a force to said second jig for urging same into sealed relation with the first side of the cylinder head; and
    a fluid input coupled to the test chamber for delivering a fluid thereto and performing a pressure retention test in the test chamber.

18. The arrangement of claim 17, wherein said eccentric cam comprises a closed, substantially annular protuberance extending substantially axially parallel to the axis of rotation, said substantially annular protuberance having radially inward and radially outward facing surfaces.

19. The arrangement of claim 18, wherein said cam follower comprises first and second cam follower rollers arranged substantially parallel to one another and arranged to communicate with respective ones of said radially inward and radially outward facing surfaces of said substantially annular protuberance.

20. The arrangement of claim 19, wherein said linear drive arrangement comprises:

a reciprocating element coupled to said first and second cam follower rollers, and having a first predetermined cross-sectional configuration; and a stationary guide way having a predetermined cross-sectional configuration that is configured to correspond to the first predetermined cross-sectional configuration.

21. The arrangement of claim 20, wherein there is further provided a sheet insert formed of polyfluorinated hydrocarbon material sold under the trademark Teflon® interposed between said reciprocating element and said stationary guideway for reducing friction therebetween.

22. The arrangement of claim 17, wherein there is further provided a valve rotating arrangement for rotating the valve with respect to the valve seat as the valve is displaced reciprocatingly along its respective displacement path.

* * * * *